United States Patent [19]
Morimoto et al.

[11] Patent Number: 6,167,018
[45] Date of Patent: Dec. 26, 2000

[54] OPTICAL INFORMATION STORAGE APPARATUS HAVING CYLINDRICAL LENS FOR ELIMINATING ASTIGMATISM GENERATED BY POLARIZATION BEAM SPLITTER AND NEWLY GENERATING ASTIGMATISM

[75] Inventors: Yasuaki Morimoto; Hideki Nishimoto; Hirataka Ukai, all of Kawasaki, Japan

[73] Assignee: Fujitsu Limited, Kawasaki, Japan

[21] Appl. No.: 09/042,918

[22] Filed: Mar. 17, 1998

[30] Foreign Application Priority Data

Oct. 6, 1997 [JP] Japan ................... 9-272866

[51] Int. Cl.[7] .............................................. G11B 7/09
[52] U.S. Cl. ........................ 369/112; 369/110; 369/44.23
[58] Field of Search ............................... 369/44.23, 44.24, 369/110, 112, 44.14, 13

[56] References Cited

U.S. PATENT DOCUMENTS

| | | |
|---|---|---|
| 4,709,139 | 11/1987 | Nakamura et al. . |
| 5,189,655 | 2/1993 | Ogata et al. ................... 369/44.23 |
| 5,428,596 | 6/1995 | Hineno et al. ................... 369/44.23 |
| 5,496,993 | 3/1996 | Kasuga . |
| 5,508,992 | 4/1996 | Hirose et al. . |
| 5,550,798 | 8/1996 | Hineno et al. ................... 369/110 |

FOREIGN PATENT DOCUMENTS

| | | |
|---|---|---|
| 61-139936 | 6/1986 | Japan . |
| 62-9537 | 1/1987 | Japan . |
| 3-3127 | 1/1991 | Japan . |
| 4-87043 | 3/1992 | Japan . |
| 5-151634 | 6/1993 | Japan . |
| 6-84226 | 3/1994 | Japan . |
| 8-507892 | 8/1996 | Japan . |
| 8-227529 | 9/1996 | Japan . |

*Primary Examiner*—Thang V. Tran
*Attorney, Agent, or Firm*—Greer, Burns & Crain, Ltd.

[57] ABSTRACT

An optical information storage apparatus is constructed to include a light source, a polarization beam splitter reflecting a light beam emitted from the light source and irradiating a reflected light beam on a recording surface of a recording medium, a first part for eliminating a coma aberration which is generated due to a light beam which is reflected by the recording surface and passes through the polarization beam splitter, a second part for eliminating an astigmatism which is generated by the polarization beam splitter and the first part, and a third part for generating an astigmatism.

10 Claims, 10 Drawing Sheets

OPTICAL INFORMATION STORAGE APPARATUS HAVING CYLINDRICAL LENS FOR ELIMINATING ASTIGMATISM GENERATED BY POLARIZATION BEAM SPLITTER AND NEWLY GENERATING ASTIGMATISM

BACKGROUND OF THE INVENTION

The present invention generally relates to optical information storage apparatuses, and more particularly to an optical information storage apparatus which is suited for reproducing a high-quality magneto-optic signal from a recording medium.

In this specification, an "information storage apparatus" refers to an apparatus which records information to and/or reproduces information from the recording medium.

In an optical information storage apparatus a light beam emitted from a light source is reflected by a plate-shaped polarization beam splitter and irradiated on a recording surface of an optical recording medium. The light beam which is reflected by the recording surface of the optical recording medium passes through the plate-shaped polarization beam splitter and is directed towards a photodetector. An astigmatism is generated when the reflected light beam from the optical recording medium passes through the plated shaped polarization beam splitter. In a compact disk player which reproduces a signal from a compact disk (CD), for example, this astigmatism is used to generate a focal error signal.

FIG. 1 is a plan view showing the general construction of an example of an optical system of the CD player. In FIG. 1, a light beam emitted from a semiconductor laser 14 is input to a diffraction grating 15, and ±1st order lights which are sub light beams used to detect a tracking error are generated. The light beam passing through the diffraction grating 15 is subjected to an amplitude division by a semitransparent mirror 16, and is reflected by the semitransparent mirror 16 depending on a reflectivity of the semitransparent mirror 16 and then input to a collimator lens 17. The collimator lens 17 converts the incoming light beam into parallel rays. The parallel rays from the collimator lens 17 are reflected in a direction perpendicular to the paper in FIG. 1 by a mirror 18 and reach an objective lens 19 which stops the rays to a diffraction limit, thereby irradiating a pit 21 provided on the CD. In FIG. 1, an arrow 20 indicates a direction of an electric vector of the light irradiated on the CD. In the case of the CD, the direction 20 of the electric vector of the light irradiated on the CD is not very important, but this direction 20 is set to a 45° direction with respect to a row of the pits 21.

The light reflected by the pit 21 is again input to the objective lens 19, and is passed through the collimator lens 17 to become a convergent light. This convergent light is subjected to an amplitude division by the semitransparent mirror 16, and is transmitted through the semitransparent mirror 16 depending on a transmittance of the semitransparent mirror 16. The light transmitted through the semitransparent mirror 16 generates an astigmatism and a coma aberration. The coma aberration is eliminated and only the astigmatism is extracted from the light transmitted through the semitransparent mirror 16, by passing the light from the semitransparent mirror 16 through a plano-concave lens 22 which is inclined in a direction opposite to the inclination of the semitransparent mirror 16. The light which passes through the plano-concave lens 22 is detected by a photodetector 23a, and a radio frequency (RF) signal, a focal error signal and a tracking error signal are generated based on an output of the photodetector 23a.

FIG. 2 is a plan view showing the general construction of the photodetector 23a on an enlarged scale. The photodetector 23a includes a 4-part detector 24a which is made up of detector parts A, B, C and D, a detector 25a, and a detector 26a. The RF signal is generated from a sum A+B+C+D of output photocurrents A, B, C and D of the detector parts A, B, C and D of the 4-part detector 24a. The focal error signal is generated from a difference between a sum A+C of the output photocurrents A and C of the detector parts A and C of the 4-part detector 24a, and a sum B+D of the output photocurrents B and D of the detector parts B and D of the 4-part detector 24a. The tracking error signal is generated from a difference between an output photocurrent of the detector 25a and an output photocurrent of the detector 26a. A push-pull signal which appears in a radial direction of the CD depending on the row of the pits 21 provided on the CD is generated in a direction indicated by an arrow in FIG. 2. This push-pull signal is not used as a tracking error signal.

As shown in FIG. 1, the CD player is designed so that the direction in which the astigmatism is generated is inclined by approximately 45° with respect to a direction in which the signal of the CD flows. This design is employed because the push-pull signal appears in the radial direction of the CD due to the diffraction phenomenon when a spot of the light beam which is stopped to the diffraction limit is irradiated on the pit 21 of the CD. A frequency of this push-pull signal is determined by an amount of decentering, a rotational speed and a track pitch of the CD. A frequency band of the push-pull signal is approximately the same as a frequency band of the focal error signal which is obtained by the astigmatism method.

On the other hand, FIG. 3 is a diagram showing a case where a direction in which the astigmatism is generated in the CD player is parallel to a direction in which the signal of the CD flows. In addition, FIG. 4 is a plan view showing the general construction of a photodetector 23b. In FIG. 3, those parts which are the same as those corresponding parts in FIG. 1 are designated by the same reference numerals, and a description thereof will be omitted.

In this case, the tracking error signal is generated from a difference between output photocurrents of detectors 25b and 26b of the photodetector 23b, and no inconvenience is introduced. However, detector parts A through D of a 4-part detector 24b that are used to generate the focal error signal must be arranged as shown in FIG. 4. Accordingly, the direction in which the astigmatism is generated becomes parallel or perpendicular to the direction in which the push-pull signal is generated, and division lines (dark lines) of the 4-part detector 24b are inclined by 45° with respect to the direction in which the push-pull signal is generated. For this reason, the push-pull signal easily mixes into the focal error signal as a crosstalk, and a stable focal error signal cannot be obtained.

In the case of a recording medium, such as the CD, exclusively for use when reproducing signals from the recording medium, no inconvenience is introduced regardless of the polarization direction of the light beam irradiated on the recording medium.

In the case of a magneto-optic recording medium, the polarization direction of the light beam irradiated on the recording surface of the magneto-optic recording medium at the time of the signal reproduction is extremely important. Generally, it is known that the noise is reduced when the polarization direction of the light beam is parallel or perpendicular to a tracking guide groove which is provided on the magneto-optic recording medium. This noise reduction is due to the birefringence of a substrate and the shape of the groove of the magneto-optic recording medium. Accordingly, in the case of the optical information storage apparatus which reproduces the signal from the magneto-optic recording medium, there was a problem in that the push-pull signal will mix into a focal error signal as a crosstalk if an attempt is made to generate the focal error signal by the astigmatism method using a plate-shaped polarization beam splitter as in the case of the CD player shown in FIG. 3, and that it is extremely difficult to generate a stable tracking error signal. On the other hand, in the case of the magneto-optic recording medium, there was a dilemma in that it is extremely important to make the polarization direction of the light beam irradiated on the recording surface parallel or perpendicular with respect to the groove of the magneto-optic recording medium.

SUMMARY OF THE INVENTION

Accordingly, it is a general object of the present invention to provide a novel and useful optical information storage apparatus in which the problems described above are eliminated.

Another and more specific object of the present invention to provide an optical information storage apparatus which can generate a stable focal error signal and a tracking error signal, and detect a high-quality magneto-optic signal, using a relatively simple and inexpensive structure.

Still another object of the present invention is to provide an optical information storage apparatus recited comprising a light source, a polarization beam splitter reflecting a light beam emitted from said light source and irradiating a reflected light beam on a recording surface of a recording medium, first means for eliminating a coma aberration which is generated due to a light beam which is reflected by the recording surface and passes through said polarization beam splitter, second means for eliminating an astigmatism which is generated by said polarization beam splitter and said first means, and third means for generating an astigmatism. According to the optical information storage apparatus of the present invention, it is possible to generate a stable focal error signal and a tracking error signal, and to detect a high-quality magneto-optic signal, using a relatively simple and inexpensive structure.

Other objects and further features of the present invention will be apparent from the following detailed description when read in conjunction with the accompanying drawings.

DESCRIPTION OF THE PREFERRED EMBODIMENTS

Figure 1:
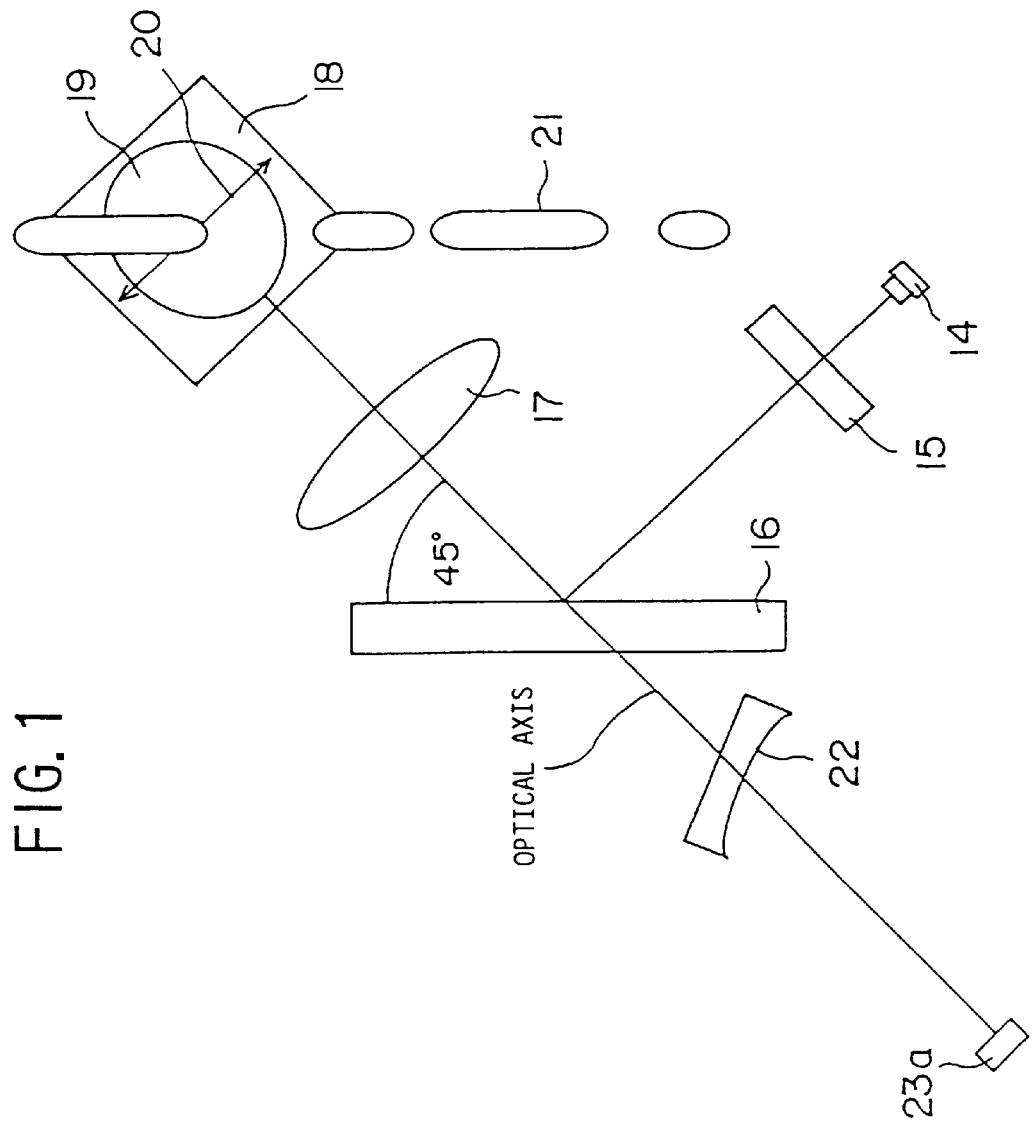
FIG. 1 is a plan view showing the general construction of an example of an optical system of a CD player.
Figure 2:
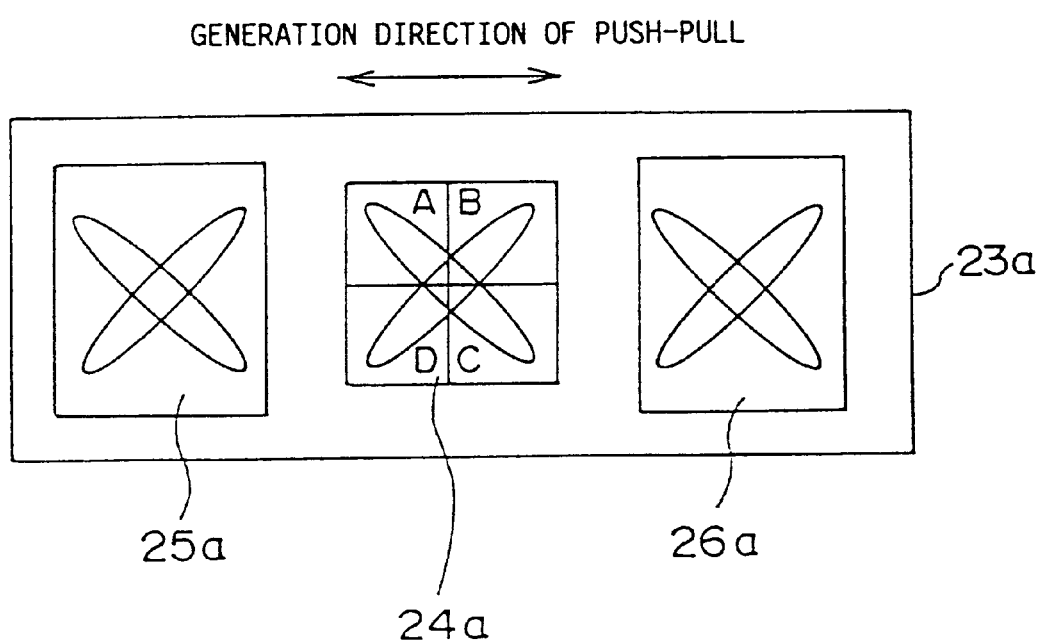
FIG. 2 is a plan view showing the general construction of a photodetector on an enlarge scale.
Figure 3:
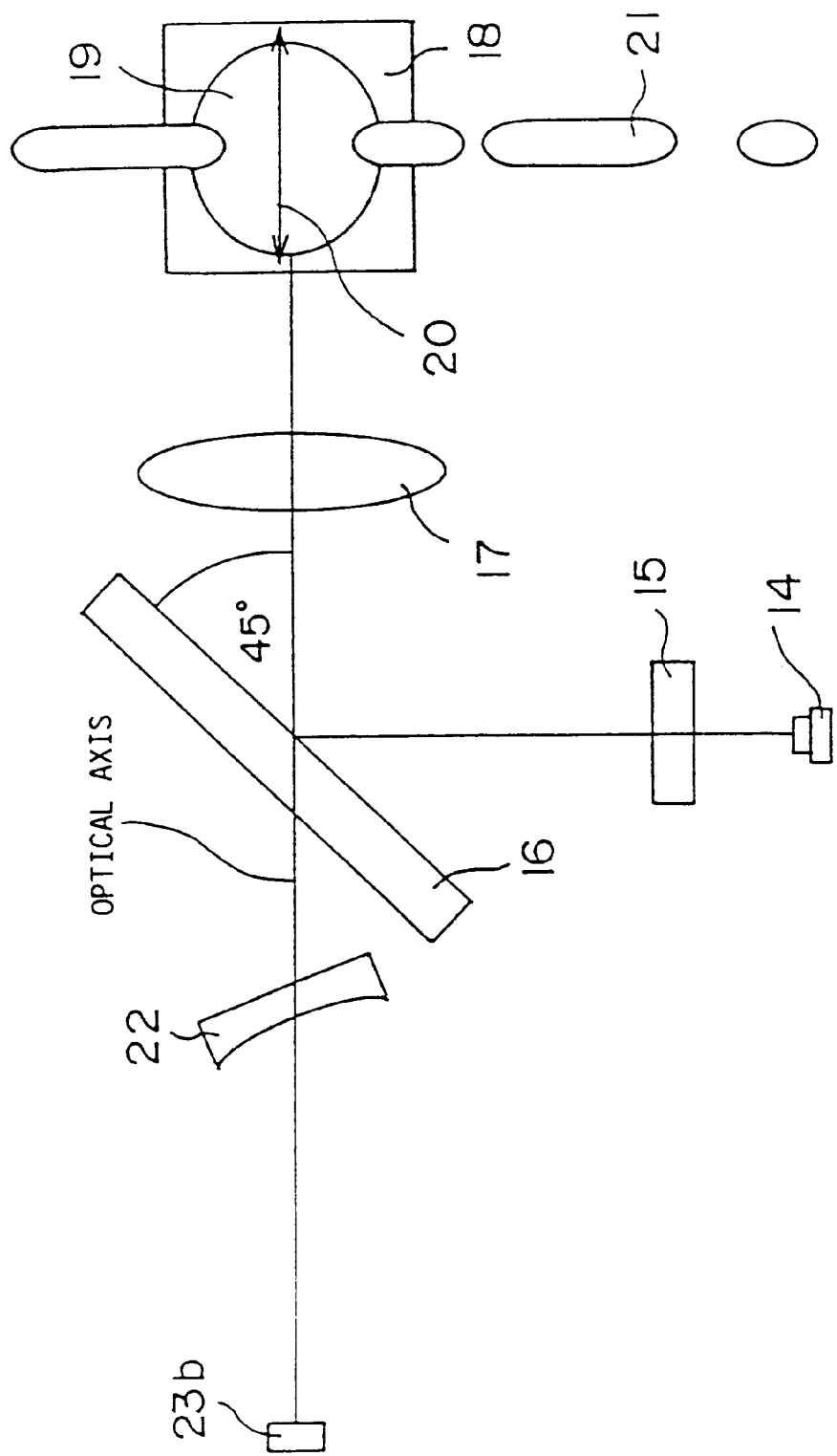
FIG. 3 is a diagram showing a case where a direction in which an astigmatism is generated in the CD player is parallel to a direction in which a signal of a CD flows.
Figure 4:
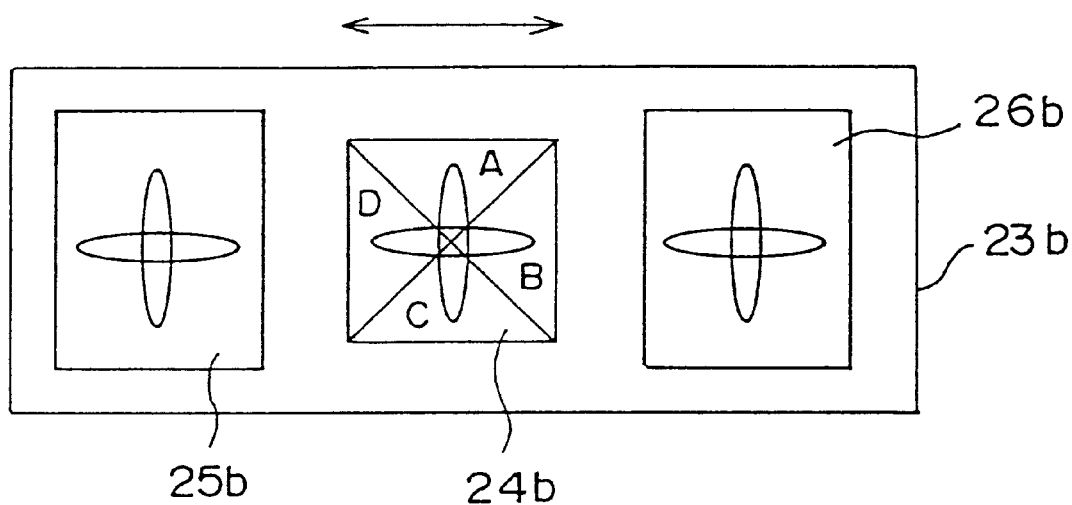
FIG. 4 is a plan view showing the general construction of a photodetector.
Figure 5:
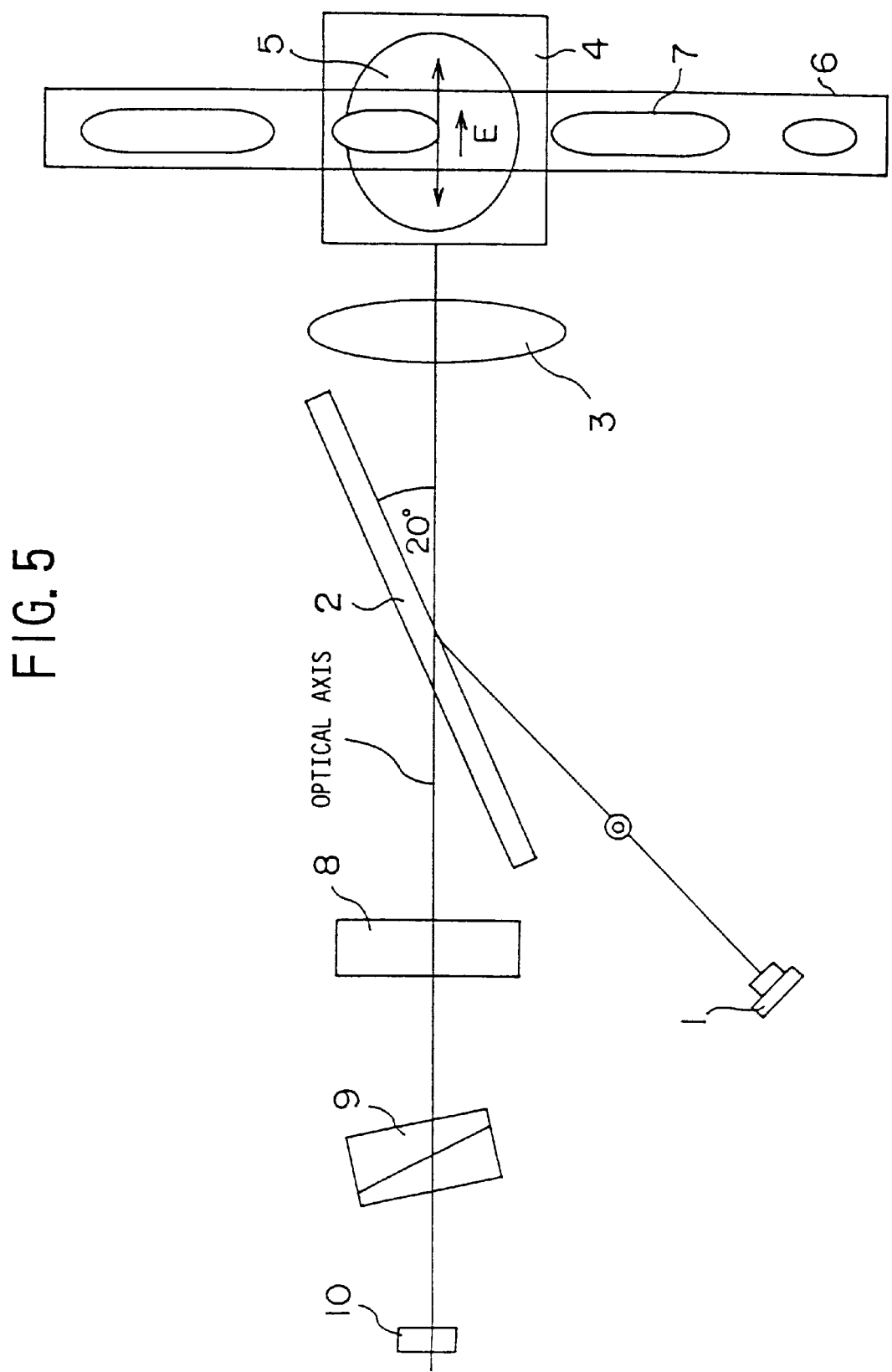
FIG. 5 is a plan view showing the general construction of an optical system of a first embodiment of an optical information storage apparatus according to the present invention.

FIG. 5 is a plan view showing the general construction of an optical system of a first embodiment of an optical information storage apparatus according to the present invention. In FIG. 5, a light beam emitted from a semiconductor laser 1 has an electric vector (S-polarized component) perpendicular to the paper in FIG. 5, and in this embodiment, this light beam is reflected by a plate-shaped polarization beam splitter 2 which is inclined by 20° with respect to an optical axis of the optical system. The plate-shaped polarization beam splitter 2 is made of a plate-shaped glass provide with a layer for making the polarization beam splitting. In a desirable arrangement of the plate-shaped polarization beam splitter 2, the plate-shaped polarization beam splitter 2 is inclined by approximately 20° to approximately 35° with respect to the optical axis of the optical system. A polarization reflection characteristic of the plate-shaped polarization beam splitter 2 is set to satisfy Tp:Rp= 80:20 and Ts:Rs=20:80, where Tp denotes the transmittance with respect to the P-polarized component, Ts denotes the transmittance with respect to the S-polarized component, Rp denotes the reflectivity with respect to the P-polarized component, and Rs denotes the reflectivity with respect to the S-polarized component.

The light beam reflected by the plate-shaped polarization beam splitter 2 is converted into parallel rays by a collimator lens 3. The parallel rays are reflected by a mirror 4 and directed to an objective lens 5 which stops the rays to a diffraction limit. The light obtained via the objective lens 5 is irradiated on a land or a groove forming a track 6 on a magneto-optic disk, and a magnetic domain 7 is recorded or, a magnetic domain 7 on the track 6 is reproduced. In FIG. 5, a direction of an electric vector of the light irradiated on the magneto-optic disk is indicated by an arrow E. This direction E of the electric vector is set perpendicular to a direction in which the track 6 extends. If the entire optical system is rotated by 90°, it is also possible to set the direction of the electric vector of the light irradiated on the magneto-optic disk to become parallel to the direction in which the track 6 extends.

A reflected light in which the plane of polarization has rotated due to the magnetic Kerr effect is again directed to the objective lens 5, from the magneto-optic disk, and becomes a convergent light by passing through the collimator lens 3. This convergent light is input to the plate-shaped polarization beam splitter 2, and is transmitted through the plate-shaped polarization beam splitter 2 depending on the polarization characteristic described above. The light transmitted through the plate-shaped polarization beam splitter 2 generates an astigmatism and a coma aberration. This light transmitted through the plate-shaped polarization beam splitter 2 is input to a cylindrical lens 8 having concave surfaces on both sides thereof.

An edge line of the concave cylindrical surface on an input side of the cylindrical lens 8 is parallel to a light incident surface of the plate-shaped polarization beam splitter 2 and is perpendicular to the optical axis. On the other hand, an edge line of the concave cylindrical surface on an output side of the cylindrical lens 8 is inclined by 45° with respect to the light incident surface of the plate-shaped polarization beam splitter 2 and is perpendicular to the optical axis. The light passing through the cylindrical lens 8 reaches a Wollaston prism 9 which is made of optical crystals. The Wollaston prism 9 is inclined within the light incident surface of the plate-shaped polarization beam splitter 2, and eliminates the coma aberration out of the astigmatism and the coma aberration generated by the plate-shaped polarization beam splitter 2. Accordingly, if the cylindrical lens 8 were not provided, the astigmatism generated by the plate-shaped polarization beam splitter 2 and the astigmatism generated due to the inclination of the Wollaston prism 9 are maintained. However, since the cylindrical lens 8 is provided in this embodiment, the astigmatism generated by the plate-shaped polarization beam splitter 2 and the astigmatism generated due to the inclination of the Wollaston prism 9 are eliminated.

The Wollaston prism 9 is made of two parallelepiped or cube shaped crystal blocks which are connected to each other within a plane where the two crystals form an angle with respect to the light incident surface. Since the Wollaston prism 9 is adjusted to an infinite focal point, the two blocks may be bonded and fixed after the adjustment.

Figure 6:
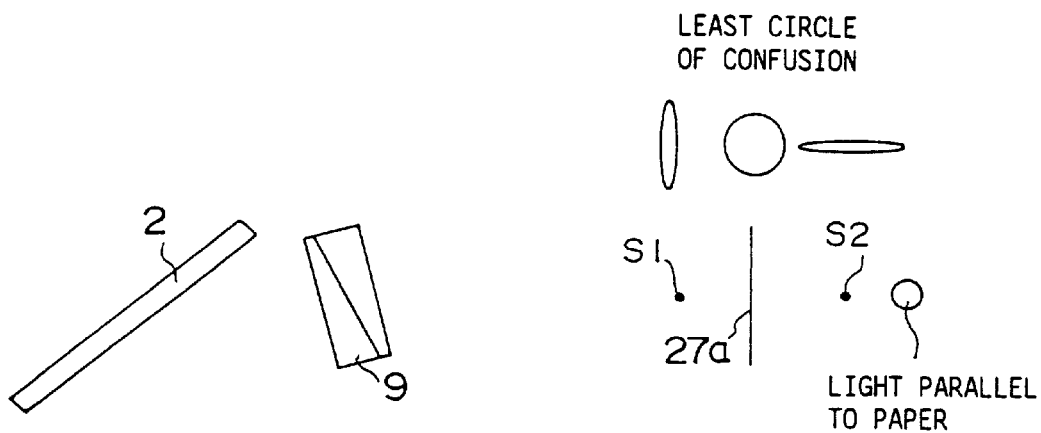
FIG. 6 is a plan view for explaining an astigmatism which is generated by a plate-shaped polarization beam splitter and an inclination of a Wollaston prism.
Figure 7:
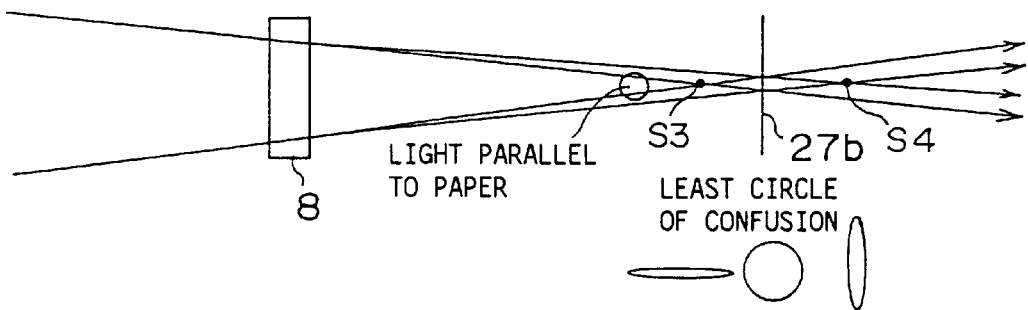
FIG. 7 is a plan view for explaining an astigmatism which is generated by a concave cylindrical surface on an input side of a cylindrical lens.

FIGS. 6 and 7 are plan views showing the general construction of the optical systems for explaining the operating principle of eliminating the astigmatism which is generated by the plate-shaped polarization beam splitter 2 and the inclination of the Wollaston prism 9. FIG. 6 is a plan view for explaining the astigmatism generated by the plate-shaped polarization beam splitter 2 and the inclination of the Wollaston prism 9, and FIG. 7 is a plan view for explaining the astigmatism generated by the concave cylindrical surface on the input side of the cylindrical lens 8.

As shown in FIGS. 6 and 7, the arrangement of the plate-shaped polarization beam splitter 2, the cylindrical lens 8 and the Wollaston prism 9 is set so that the polarity (that is, the major axis direction of the oval before and after the least circle of confusion) of the astigmatism generated by the plate-shaped polarization beam splitter 2 and the inclination of the Wollaston prism 9 and the polarity of the astigmatism generated by the concave cylindrical surface on the input side of the cylindrical lens 8 become opposite to each other, one position S1 where the oval shape with the maximum length is obtained approximately matches a corresponding position S3, and the other position S2 where the oval shape with the maximum length is obtained approximately matches a corresponding position S4. In addition, the arrangement of the plate-shaped polarization beam splitter 2, the cylindrical lens 8 and the Wollaston prism 9 is also set so that a position 27b of the least circle of confusion of the astigmatism generated by the concave cylindrical surface on the input side of the cylindrical lens 8 approximately matches a position 27a of the least circle of confusion of the astigmatism generated by the plate-shaped polarization beam splitter 2 and the inclination of the Wollaston prism 9.

In FIGS. 6 and 7, the light which is perpendicular to the paper in FIGS. 6 and 7 are also illustrated as being parallel to the paper for the sake of convenience.

As described above, the edge line of the concave cylindrical surface on the output side of the cylindrical lens 8 is inclined by 45° with respect to the light incident surface of the plate-shaped polarization beam splitter 2. Accordingly, it is possible to generate a focal error signal using the astigmatism generated by the concave cylindrical surface on the output side of the cylindrical lens 8. On the other hand, the astigmatism generated by the light incident surface of the plate-shaped polarization beam splitter 2 is generated with an inclination of 45° with respect to the light incident surface of the plate-shaped polarization beam splitter 2.

Figure 8:
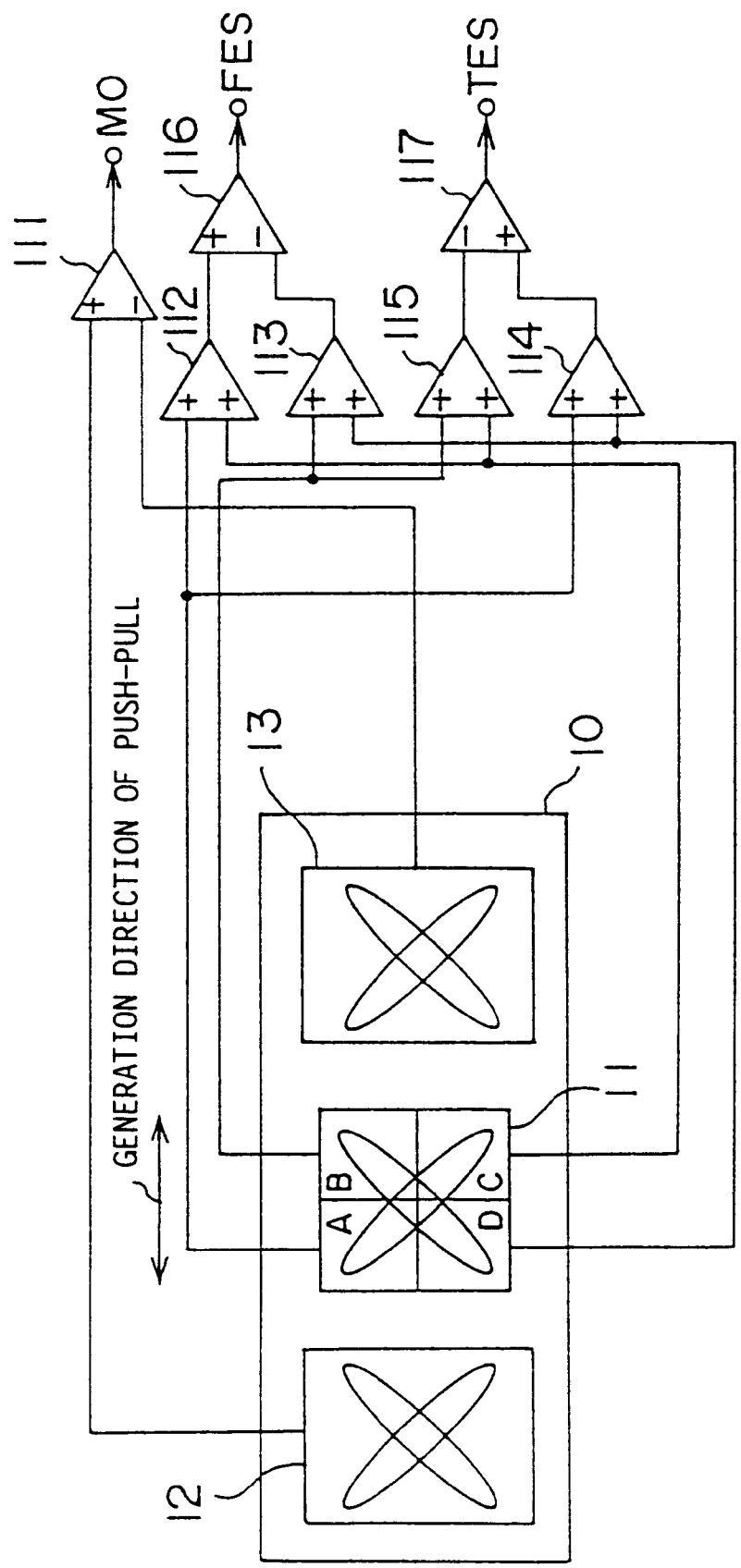
FIG. 8 is a diagram showing the general construction of a photodetector together with a signal reproducing system.

The above described phenomenon will now be described with reference to FIG. 8. FIG. 8 is a diagram showing the general construction of a photodetector 10 together with a signal reproducing system. The photodetector 10 includes a 4-part detector 11 made up of detector parts A, B, C and D, a detector 12, and a detector 13. A magneto-optic signal (MO) is generated from a differential amplifier 111 which obtains a difference between output currents of the detectors 12 and 13. A focal error signal (FES) is generated by a differential amplifier 116 which obtains a difference (A+C)−(B+D) between an output (A+C) of an operational amplifier 112 which obtains a sum of output photocurrents A and C of the detector parts A and C of the 4-part detector 11 and an output (B+D) of an operational amplifier 113 which obtains a sum of output photocurrents B and D of the detector parts B and D of the 4-part detector 11. A tracking error signal (TES) is generated by a differential amplifier 117 which obtains a difference (A+D)−(B+C) between an output (A+D) of an operational amplifier 114 which obtains a sum of output photocurrents A and D of the detector parts A and D of the 4-part detector 11 and an output (B+C) of an operational amplifier 115 which obtains a sum of output photocurrents B and C of the detector parts B and C of the 4-part detector 11.

As shown in FIG. 8, the direction of the astigmatism is inclined by 45° with respect to a direction in which the push-pull signal is generated depending on the diffraction phenomenon caused by the groove provided on the magneto-optic disk. In other words, division lines (dark lines) of the 4-part detector 11 can be arranged in a direction parallel to the groove or in a direction perpendicular to the groove. For this reason, the mixing of the push-pull signal into the focal error signal (FES) as a crosstalk is suppressed, and it is possible to generate a stable focal error signal (FES). As a result, it is possible to generate a stable tracking error signal (TES). Furthermore, since the magneto-optic signal (MO) is obtained from the difference of the output currents of the detectors 12 and 13, the problem of crosstalk will not occur, and it is possible to generate a magneto-optic signal (MO) having a high quality.

In addition, the Wollaston prism 9 used in this embodiment has a construction such that the optical axes showing the optical anisotropies of the optical crystals which are connected are non-perpendicular to each other. Hence, a total of 3 lights (light beams) are obtained from the Wollaston prism 9, where the 3 light beams are made up of 2 light beams having mutually perpendicular planes of polarization and mutually different progressing directions, and 1 light beam in which components of these 2 light beams coexist. As described above, this 1 light beam in which the components of the 2 light beams coexist is used to generate the focal error signal (FES) and the tracking error signal (TES). On the other hand, the 2 light beams having mutually perpendicular planes of polarization are used to generate the magneto-optic signal (MO).

Figure 9:
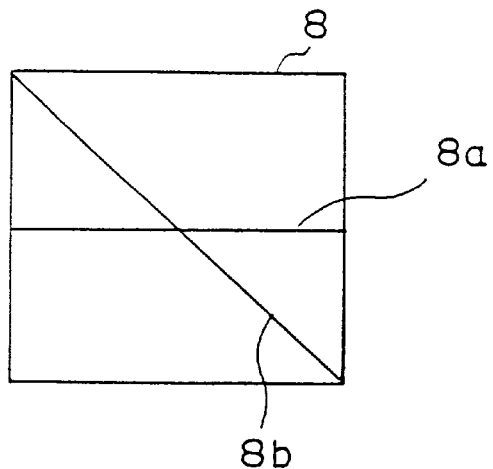
FIG. 9 is a plan view showing an embodiment of the cylindrical lens.
Figure 10:
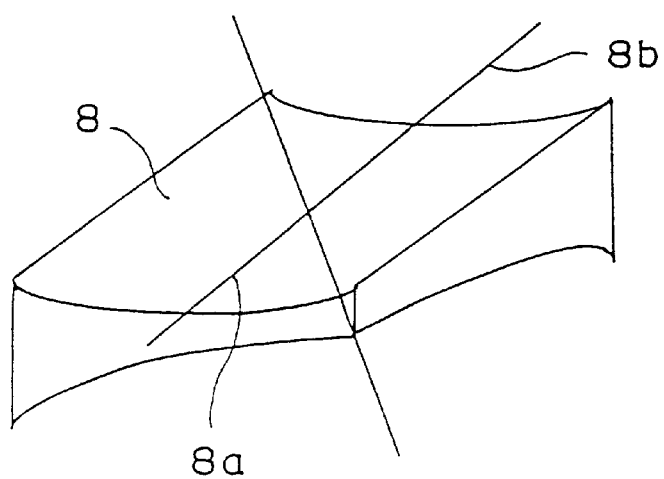
FIG. 10 is a perspective view showing the embodiment of the cylindrical lens.

FIG. 9 is a plan view showing an embodiment of the cylindrical lens 8, and FIG. 10 is a perspective view showing the embodiment of the cylindrical lens 8. In FIGS. 9 and 10, the concave cylindrical surface on the input side of the cylindrical lens 8 and the concave cylindrical surface on the output side of the cylindrical lens 8 intersect at a 45° angle to each other. In other words, an edge line 8a on the input side of the cylindrical lens 8 and an edge line 8b on the output side of the cylindrical lens 8 intersect at a 45° angle to each other.

In this embodiment, the coma aberration generated by the plate-shaped polarization beam splitter 2 is eliminated by arranging the Wollaston prism 9 with an inclination. In addition, by use of the cylindrical lens 8 having the edge lines 8a and 8b which form a 45° angle to each other, the astigmatism that is generated by the plate-shaped polarization beam splitter 2 and the inclination of the Wollaston prism 9 is eliminated by one of the concave cylindrical surfaces of the cylindrical lens 8, and an astigmatism is newly generated by the other of the concave cylindrical surfaces of the cylindrical lens 8.

Therefore, according to this embodiment, the division lines of the 4-part detector 11 are arranged to be parallel or perpendicular to the track 6 which is formed on the recording surface of the magnet-optic disk when generating the focal error signal (FES) according to the astigmatism method by irradiating on the track 6 a light beam which has an electric vector perpendicular or parallel to the track 6. As a result, it is possible to suppress mixing of the push-pull signal into the focal error signal (FES) as a crosstalk. In addition, it is possible to similarly suppress mixing of the push-pull signal into the tracking error signal (TES) when generating the tracking error signal (TES). Therefore, it is possible to carry out stable focus servo and tracking servo operations based on the focal error signal (FES) and the tracking error signal (TES). Furthermore, it is also possible to generate the magneto-optic signal (MO) having a high quality. In other words, it is possible to realize a high-performance optical information storage apparatus by use of an optical system having a relatively simple and inexpensive construction.

In the embodiment described above, the edge line 8a on the input side of the cylindrical lens 8 is parallel to the light incident surface of the plate-shaped polarization beam splitter 2 and is perpendicular to the optical axis. In addition, the edge line 8b on the output side of the cylindrical lens 8 is inclined by 45° with respect to the light incident surface of the plate-shaped polarization beam splitter 2 and is perpendicular to the optical axis. However, these relationships may be reversed as in the case of a second embodiment described in the following.

Figure 11:
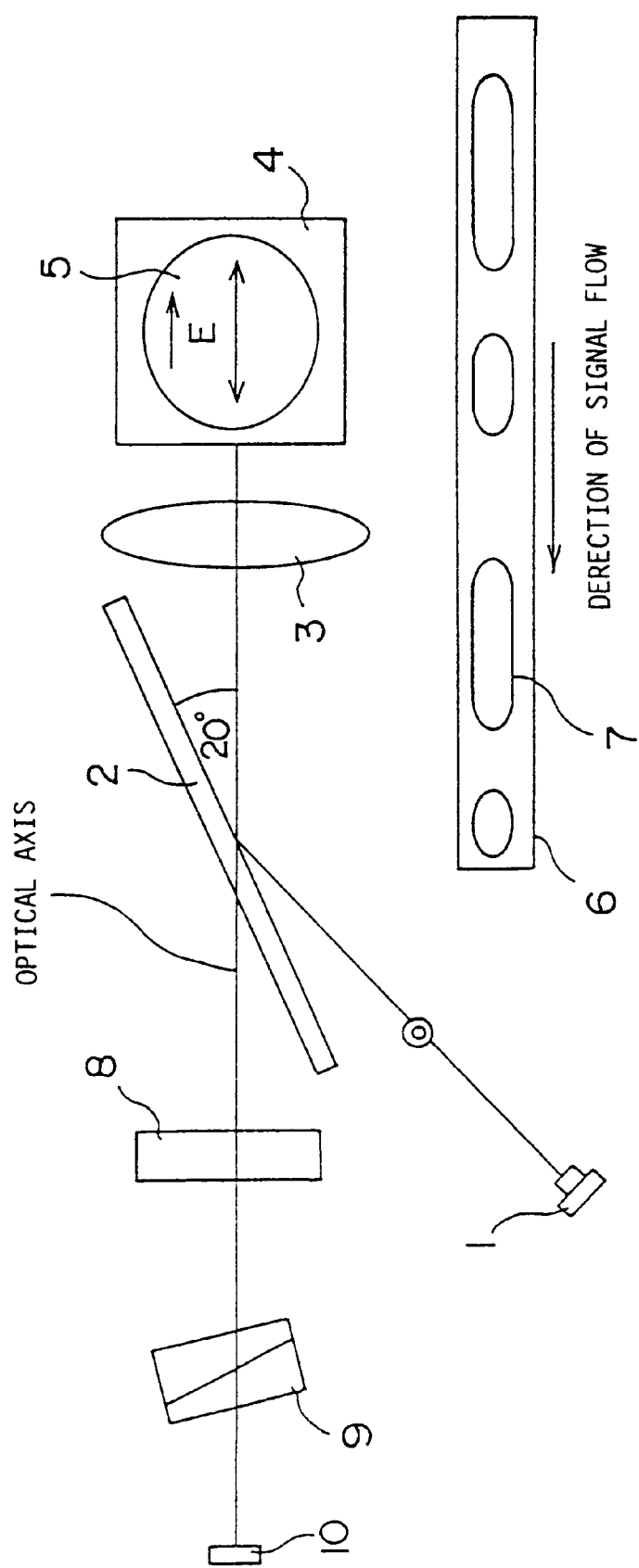
FIG. 11 is a plan view showing the general construction of an optical system of a second embodiment of the optical information storage apparatus according to the present invention.

FIG. 11 is a plan view showing the general construction of an optical system of a second embodiment of the optical information storage apparatus according to the present invention. In FIG. 11, those parts which are the same as those corresponding parts in FIG. 5 are designated by the same reference numerals, and a description thereof will be omitted.

In this embodiment, the edge line 8a on the input side of the cylindrical lens 8 is inclined by 45° with respect to the light incident surface of the plate-shaped polarization beam splitter 2 and is perpendicular to the optical axis, as shown in FIG. 11. In addition, the edge line 8b on the output side of the cylindrical lens 8 is parallel to the light incident surface of the plate-shaped polarization beam splitter 2 and is perpendicular to the optical axis. Further, a direction E of an electric vector of the light irradiated on the track 6 of the magneto-optic disk is parallel to a direction in which the track 6 extends. If the entire optical system is rotated by 90°, the direction E of the electric vector of the light irradiated on the track 6 of the magneto-optic disk may be perpendicular to the direction in which the track 6 extends, similarly as in the case of the first embodiment described above.

Figure 12:
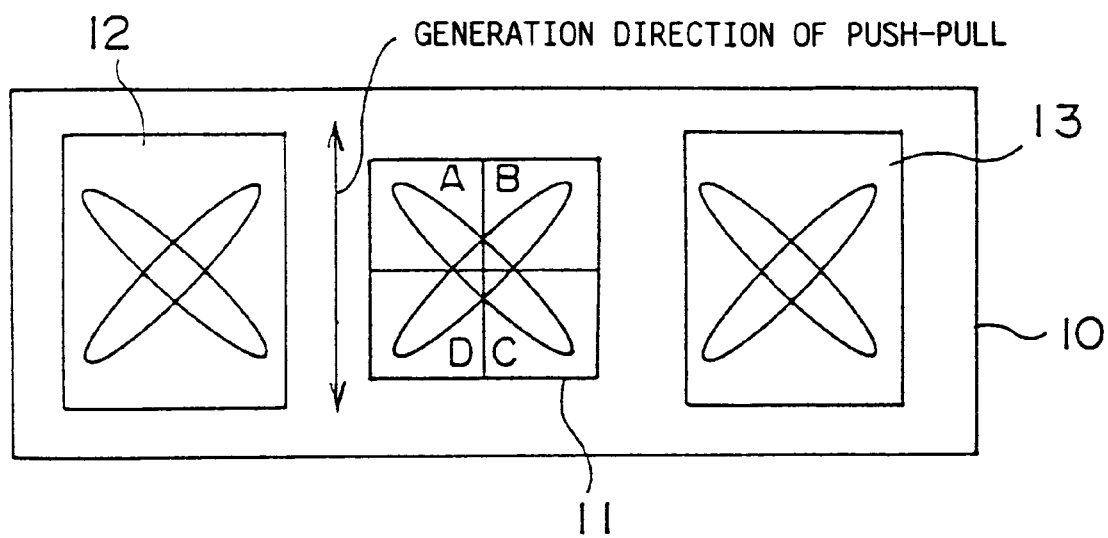
FIG. 12 is a plan view showing the general construction of a photodetector on an enlarged scale.

FIG. 12 is a plan view showing the general construction of the photodetector 10 shown in FIG. 11 on an enlarged scale. In FIG. 12, those parts which are the same as those corresponding parts in FIG. 8 are designated by the same reference numerals, and a description thereof will be omitted. As may be seen from FIG. 12, the direction in which the push-pull signal is generated in this embodiment is changed by 90° as compared to that of the first embodiment described above.

The effects obtainable by this embodiment are similar to those obtained in the first embodiment described above.

In each of the embodiments described above, the magneto-optic disk is used as the recording medium, but the present invention is of course similarly applicable to other magneto-optic recording mediums.

Further, the present invention is not limited to these embodiments, but various variations and modifications may be made without departing from the scope of the present invention.

What is claimed is:

1. An optical information storage apparatus comprising:
   a light source;
   a polarization beam splitter reflecting a light beam emitted from said light source and irradiating a reflected light beam on a recording surface of a recording medium;
   a Wollaston prism eliminating a coma aberration which is generated due to a light beam which is reflected by the recording surface and passes through said polarization beam splitter; and
   a cylindrical lens, eliminating an astigmatism which is generated by said polarization beam splitter and said Wollaston prisms, and newly generating an astigmatism,
   said cylindrical lens having cylindrical surfaces, with edge lines, provided on respective sides thereof,
   said edge lines crossing at an angle of 45° with respect to each other.

2. The optical information storage apparatus as claimed in claim 1, wherein said edge lines are parallel to a light incident surface of said polarization beam splitter to which the light beam from said light source is irradiated and are perpendicular to optical axes of said Wollaston prism and said cylindrical lens.

3. The optical information storage apparatus as claimed in claim 2, wherein one of said edge lines is parallel to a light incident surface of said polarization beam splitter to which the light beam from said light source is irradiated and is perpendicular to optical axes of said Wollaston prism and said cylindrical lens, and the other of said edge lines is inclined 45° with respect to the light incident surface of said polarization beam splitter and is perpendicular to the optical axes of said Wollaston prism and said cylindrical lens.

4. An optical information storage apparatus comprising:
   a light source;
   a polarization beam splitter reflecting a light beam emitted from said light source and irradiating a reflected light beam on a recording surface of a recording medium;
   first means for eliminating a coma aberration which is generated due to a light beam which is reflected by the recording surface and passes through said polarization beam splitter;

second means, arranged between said polarization beam splitter and said first means, for eliminating an astigmatism which is generated by said polarization beam splitter and said first means, and newly generating an astigmatism, wherein said first means comprises an optical crystal element which is optically transparent with respect to the light beam from said light source, and said optical crystal element has an input surface which receives the reflected light beam from the recording medium, and an output surface which outputs the reflected light beam from said optical crystal element and is parallel to the input surface.

5. The optical information storage apparatus as claimed in claim 4, wherein the input surface and the output surface of said optical crystal element as perpendicular to a light incident surface of said polarization beam splitter to which the light beam from said light source is irradiated and are inclined with respect to a plane which includes the optical axes of said first and second means.

6. The optical information storage apparatus as claimed in claim 4, wherein said optical crystal element comprises a Wollaston prism.

7. The optical information storage apparatus as claimed in claim 6, wherein said Wollaston prism comprises a pair of optical crystals which are connected, and optical axes indicating optical anisotropies of said optical crystals are non-perpendicular to each other.

8. An optical information storage apparatus comprising;

a light source;

a polarization beam splitter reflecting a light beam emitted from said light source and irradiating a reflected light beam on a recording surface of a recording medium;

first means for eliminating a coma aberration which is generated due to a light beam which is reflected by the recording surface and passes through said polarization beam splitter;

second means, comprising a cylindrical lens arranged between said polarization beam splitter and said first means, for eliminating an astigmatism which is generated by said polarization beam splitter and said first means, and newly generating an astigmatism, wherein said first means comprises an optical crystal element which is optically transparent with respect to the light beam from said light source, and said optical crystal element has an input surface which receives the reflected light beam from the recording medium, and an output surface which outputs the reflected light beam from said optical crystal element and is parallel to the input surface.

9. An optical information storage apparatus comprising:

a light source;

a polarization beam splitter reflecting a light beam emitted from said light source and irradiating a reflected light beam on a recording surface of a recording medium;

first means for eliminating a coma aberration which is generated due to a light beam which is reflected by the recording surface and passes through said polarization beam splitter;

second means, arranged between said polarization beam splitter and said first means, for eliminating an astigmatism which is generated by said polarization beam splitter and said first means, and newly generating an astigmatism, wherein said first means comprises an optical crystal element which is optically transparent with respect to the light beam from said light source, and said optical crystal element has an input surface which receives the reflected light beam from the recording medium, and an output surface which outputs the reflected light beam from said optical crystal element and is parallel to the input surface, and said cylindrical lens has concave cylindrical surfaces, with edge lines, provided on respective sides thereof, and said edge lines are parallel to a light incident surface of said polarization beam splitter to which the light beam from said light source is irradiated and are perpendicular to optical axes of said first and second means.

10. An optical information storage apparatus comprising:

a light source;

a polarization beam splitter reflecting a light beam emitted from said light source and irradiating a reflected light beam on a recording surface of a recording medium;

first means for eliminating a coma aberration which is generated due to a light beam which is reflected by the recording surface and passes through said polarization beam splitter;

second means, arranged between said polarization beam splitter and said first means, for eliminating an astigmatism which is generated by said polarization beam splitter and said first means, and newly generating an astigmatism, wherein said first means comprises an optical crystal element which is optically transparent with respect to the light beam from said light source, and said optical crystal element has an input surface which receives the reflected light beam from the recording medium, and an output surface which outputs the reflected light beam from said optical crystal element and is parallel to the input surface, and said cylindrical lens has concave cylindrical surfaces, with edge lines, provided on respective sides thereof, one of said edge lines is parallel to a light incident surface of said polarization beam splitter to which the light beam from said light source is irradiated and is perpendicular to optical axes of said first and second means, and the other of said edge lines is inclined 45° with respect to the light incident surface of said polarization beam splitter and is perpendicular to the optical axes of said first and second means.

* * * * *

UNITED STATES PATENT AND TRADEMARK OFFICE
CERTIFICATE OF CORRECTION

PATENT NO. : 6,167,018
DATED : December 26, 2000
INVENTOR(S) : Morimoto et al.

It is certified that error appears in the above-identified patent and that said Letters Patent is hereby corrected as shown below:

Claim 1,
Line 9, delete "prisms" and insert -- prism -- therefor.

Signed and Sealed this

Eighteenth Day of December, 2001

Attest:

JAMES E. ROGAN
*Attesting Officer*     *Director of the United States Patent and Trademark Office*